April 18, 1950           E. FIELD           2,504,402
FORMALDEHYDE SYNTHESIS
Filed Oct. 27, 1945
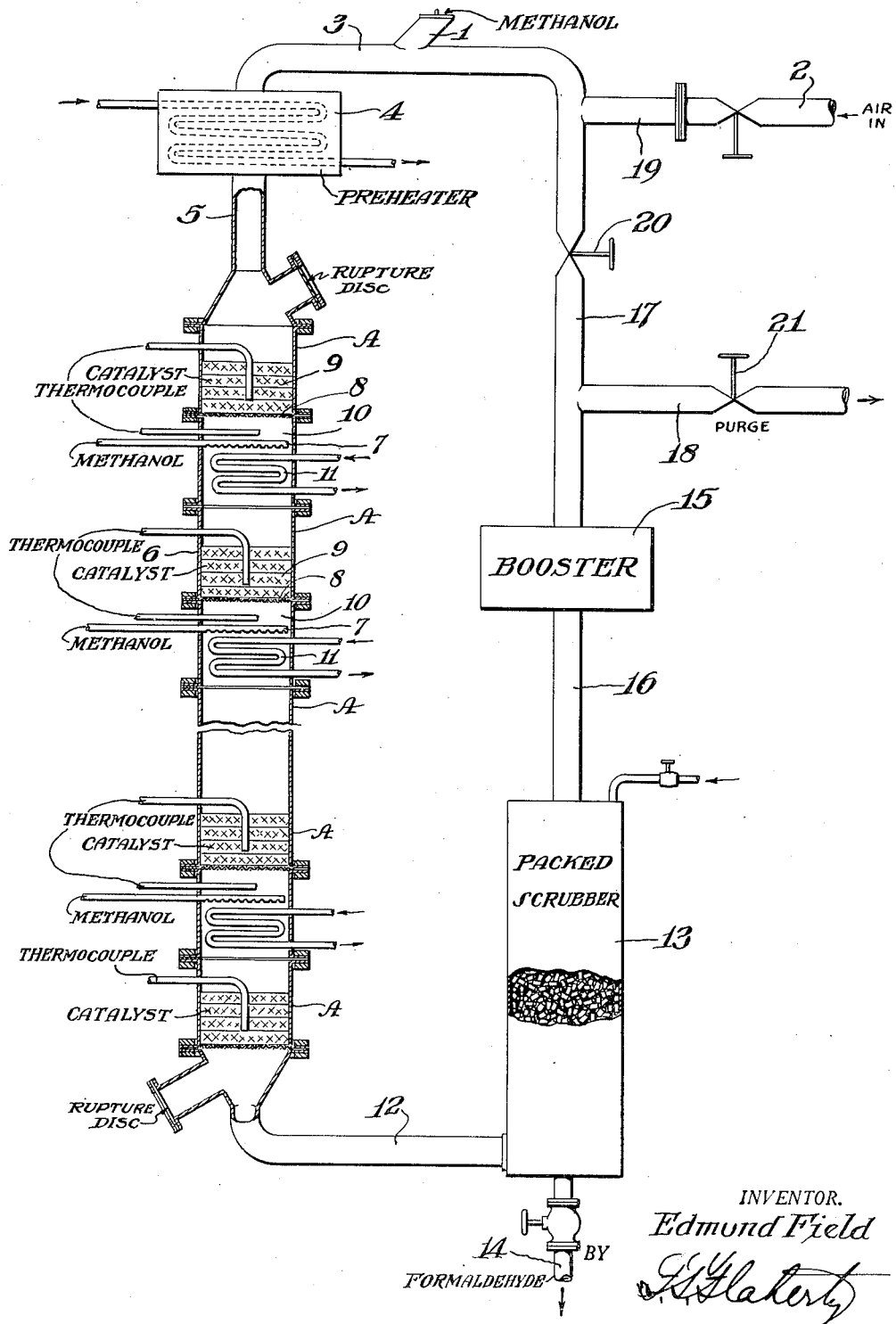
INVENTOR.
Edmund Field
ATTORNEY Patented Apr. 18, 1950

2,504,402

UNITED STATES PATENT OFFICE 2,504,402

FORMALDEHYDE SYNTHESIS

Edmund Field, Wilmington, Del., assignor to E. I. du Pont de Nemours & Company, Wilmington, Del., a corporation of Delaware Application October 27, 1945, Serial No. 625,062

13 Claims. (Cl. 260—603)

This invention relates to a process for the catalytic oxidation of methanol to formaldehyde and to improved apparatus and methods for conducting the reaction.

A number of processes have been employed for the preparation of formaldehyde since its discovery by A. W. Hoffmann. The commercial processes which have been utilized comprise to a large extent the catalytic oxidation or dehydrogenation of methanol in the presence of suitable catalysts therefor. The invention of the instant case is directed principally to the oxidation of methanol to formaldehyde, the catalyst being present in the reduced state or as an oxide of a metal or a mixture of metal or their oxides.

The commercial processes employed for the oxidation of methanol, and particularly those employing metal oxide catalysts, are generally operated by introducing air, containing as it does about 21% oxygen, together with a small amount of methanol into the reactor wherein all of the methanol is oxidized to formaldehyde. The exit gas from the converter is scrubbed with water or some other medium for removing the formaldehyde from the large amount of nitrogen and oxygen present. The amount of methanol that may be employed in such a reaction is quite limited for it has been determined by careful experimental work as reported by Bureau of Mines, Bull. 279, 1939, page 82 et seq., that if methanol is present in amounts greater than about 6.7% an explosive mixture results with the air. Naturally no more than 6.7% methanol, therefore, can be tolerated in such reactions. The disadvantages resulting from operation in this manner are many, two of the most outstanding being that only a relatively small amount of the oxygen present in the inlet air can be consumed in oxidizing the methanol to formaldehyde and relatively large equipment such as converters, blowers, scrubbers, etc. is required to handle the large amounts of gas and to recover the formaldehyde from the product gases. The latter disadvantage is apparent when it is appreciated that all of the nitrogen and most of the oxygen passes through the reactor and auxiliary equipment unchanged.

An object of the present invention is to provide a process wherein substantially all of the oxygen present in the air or other gas mixture introduced into a formaldehyde-methanol oxidation converter can be consumed directly in the preparation of formaldehyde. Another object is to provide a process wherein the products obtained have a high concentration of formaldehyde. Yet another object is to provide equipment for the oxidation of methanol to formaldehyde requiring considerably less capital cost than is required for equipment for equivalent production by the known processes of the art. Other objects and advantages of the invention will hereinafter appear.

The invention is based on the well known process of oxidizing methanol to formaldehyde utilizing well known catalysts and well known conditions of temperature and/or pressure under which the reaction is conducted. It follows, therefore, that the invention hereinafter described is not limited to the use in this synthesis of any particular catalyst or reaction conditions such as temperature, pressure, time of reaction, etc.

Briefly stated, the invention involves oxidizing methanol in a plurality of stages, in the first stage air (or other gas containing oxygen) and methanol are introduced into the reactor and all of the methanol converted in this mixture to formaldehyde. This stage of the reaction is comparable to the well known processes in operation prior to this invention. The formaldehyde, oxygen, nitrogen and other products, if any, from the first stage are not, however, immediately treated for the separation of formaldehyde as taught by the art but, on the contrary, are subjected to a subsequent treatment after the addition of more methanol whereby the newly added methanol is oxidized to formaldehyde and from this second stage a product issues which contains the formaldehyde of the first and the formaldehyde of the second stage with little or no methanol; more methanol is added and this product, also without the removal of the formaldehyde, subjected to a third reaction stage and the series of oxidation steps thus continued until all or substantially all of the oxygen initially introduced has been consumed. There issues from the last stage of the reactor a mixture of vapors having a high concentration of formaldehyde and substantially no oxygen. From this mixture the formaldehyde can be readily scrubbed with simple relatively inexpensive equipment.

The reaction is further improved by other features and details of the invention. Between the various stages of the reaction it has been found desirable to provide a cooling unit so that the exothermic heat produced in the previous stage can be removed before the mixture plus the added methanol is introduced into a subsequent stage. This feature has many advantages. One of the large items of expense in the preparation of formaldehyde is involved in catalyst replacement.

It has been found, in the development of this invention, that catalyst life can be considerably extended if the temperature rise within a catalyst bed be maintained within a narrow temperature range such as, e. g. a temperature differential from the entrance to the exit of the bed of about 75° to 150° C. and preferably not more than 200° C. Temperature differentials in use prior to this invention may range from say 250 to 450° C. With such a range a catalyst's life is much shorter than when the differential within the bed is maintained at 200° C. or less. By operating each reaction stage within a narrow temperature interval and preferably prior to introducing the reaction mixture into the next zone removing the exothermic heat developed in the preceding zone, improved catalyst life results.

Furthermore, a plurality of stages permits, if desired, different temperature differentials in each stage. For example, a fresh catalyst is more highly active at low reaction temperature than a partially spent catalyst and will give a longer life if it be initially operated at a low temperature and under a temperature differential of less than 200° C. A partially spent catalyst will operate more satisfactorily at a higher temperature and consequently it is often desirable to maintain the various stages under different temperature differentials. The process of the instant case makes such flexibility of operation simple, inexpensive, and efficient. Moreover, not only may different temperatures and different temperature intervals be used in the different stages but also different catalysts. For example, it may be desirable and in some instances is very advantageous to employ a clean-up catalyst in the last stage whereby all of the methanol down to a fraction of a percent is oxidized in order to produce a formaldehyde containing a minimum of methanol, the presence of which, in many instances, is not desirable in the product.

The objects and advantages of the invention may be more readily visualized by reference to the single figure of the drawing which illustrates diagrammatically a preferred embodiment of the invention. A reaction mixture made up of methanol from pipe 1 and air from pipe 2 is introduced through pipe 3, into the preheater 4, wherein the mixture is brought up to the temperature of the reaction and from this preheater the gaseous mixture at temperature is passed through pipe 5 into converter 6. Converter 6 is provided with a number of sections A. These sections are substantially identical in construction each section being provided with a screen 8 upon which the catalyst 9 is supported. The entering gases pass into the top portion of section A then into the catalyst bed 9, wherein the methanol is catalytically oxidized to formaldehyde. The resulting mixture of formaldehyde, unused oxygen, and nitrogen (if air is the oxidizing gas introduced, although pure oxygen-nitrogen mixtures or for that matter other mixtures of oxygen with inert gases or vapors, other than nitrogen, may be used such, for example, as carbon dioxide) pass through screen 8 into space 10 wherein another charge of methanol is vaporized from pipe 7 into the mixture of gases. This gaseous mixture then passes over the cooling coils 11. These coils have sufficient cooling capacity to drop the temperature of the mixture to any desired degree but ordinarily are used to remove only the exothermic heat of the preceding reaction. The gaseous mixture thus cooled is then passed into the catalyst of the next section and the oxidation reaction repeated. After passing through all of the sections of the converter the mixture of gases issuing from the bottom consists essentially of formaldehyde, water vapor, nitrogen, (or the other inert gas used) with substantially no oxygen or methanol. This mixture is passed through pipe 12 into a suitable scrubbing tower 13, wherein the formaldehyde is scrubbed from the gases by water or other scrubbin medium and resulting mixture passed from the bottom of the scrubber through pipe 14 to storage. The scrubbed gases, which are nearly pure nitrogen if air is used as the oxidizing gas, are drawn by means of blower 15 into pipe 16 and may be returned to the system or vented to the atmosphere. By means of the purge line 18, air intake 2 and line 19 any desired oxidizing gas mixture can be used in the unit. For example, it is possible to use this unit as a once-through converter employing only air as the entering gas and discharging all of the scrubbed gas through purge line 18. This is effected by closing valve 20 and maintaining valve 21 at full aperture. Contrarywise, by adjusting the valves 20 and 21 the oxygen introduced into the converter in the oxidizing gas can be reduced from the oxygen concentration of air, approximately 21%, to any lower percentage desired, by mixing the air with the gas from pipe 16, for the scrubbed gas contains substantially no oxygen and is substantially all inert gases. On the other hand, if desired, an oxidizing gas containing more than 21% oxygen may be used by closing valve 20 and introducing into the air stream from pipe 19 a stream of pure oxygen or a gas higher than 21% in oxygen.

There are many advantages in operating the formaldehyde synthesis in accord with applicant's process and apparatus. They include: (1) longer catalyst life, (2) flexible operation of catalyst bed in accord with the best operational procedure for the type catalyst or activity of the catalyst used; (3) lower formic acid produced due to the lower operational temperature; (4) more complete clean-up of the methanol because of the possibility of using catalyst with optimum clean-up conditions in the last stage of the reaction or of using a special clean-up catalyst; (5) better yield of formaldehyde due to the superior control of the reaction temperature resulting in decreased side reactions; (6) improved capacity of unit per volume of gas pumped; and (7) flexibility of ratio of oxygen to methanol which may be employed in the various stages.

The number of reaction stages used will, of course, be determined by the reaction conditions, the temperature differential allowed in each stage which in turn governs the amount of oxidation, the exothermic heat to be removed, etc. For example, if no oxygen is introduced between the stages (although it may be if desired) and air is the oxidizing gas, using a 100° C. temperature differential, the number of stages recommended is the total adiabatic rise divided by 100, plus one for clean-up of methanol. Moreover, the total rise in all stages is determined by the ratio of oxygen to methanol, under any given conditions of catalyst and permissible inlet and exit oxygen.

Typical operation of the invention is illustrated by the following examples.

*Example 1.*—A ten tray converter (6" I. D.) was charged with an iron promoted molybdenum oxide catalyst. The first 4 trays were filled to a depth of 3", the next 4 to 4" and the last 2 to 5". Air was recirculated through the converter and scrubber at a rate of 1380 ft.$^3$ (S. T. P.) and methanol flow started. Sufficient gas was purged after the scrubber to maintain the oxygen concentration constant at 5% after reaction started. When steady conditions were reached, 12.6 lb. methanol per hour divided equally between the first 9 trays were injected into the converter. The operating temperature of these trays was 270° C. inlet and 325° C. exit. The tenth tray was operated at 305–312° C. with no methanol injection in order to complete the oxidation of any unreacted methanol.

The methanol feed was converted to the extent of 91–3% to formaldehyde and 1.1% passed through unchanged.

*Example 2.*—During the same run described in Example 1, with the same gas recirculation rate, still higher methanol injection rates were employed. The feed rate, divided between the first 9 trays, was 14.9 lb./hr. Catalyst bed temperatures were 270° C. inlet and 335° C. exit. 91.9% of the methanol was converted to formaldehyde.

The process of the invention is susceptible of operation with close and accurate control of the ratio of oxygen to methanol introduced before each stage of the reaction. By proper regulation of inlet air and recycled gases the ratio can be adjusted at will in order to so direct the course of the reaction that the desired gaseous mixture is being introduced into each of the catalyst zones.

The flexibility of control permits operation under conditions which heretofore have not been possible. It is well known that there are two zones in which mixtures of air and methanol are non-explosive, one is a mixture containing a definite excess of methanol and the other a definite excess of air. In the oxidation of methanol by the use of metal oxide catalysts the non-explosive air to methanol ratio is employed in which the air is present in large excess. This is in contradistinction to the formaldehyde synthesis by methanol reduction in which the silver gauze type catalyst is used and wherein the methanol is employed in excess.

One of the limitations on the use of metal oxide catalysts has been that as the methanol is increased with respect to the air and oxygen a point is reached at which the mixture is explosive. This point which must not be exceeded is that at which the ratio of air to methanol is in the order of 14:1; in other words, the methanol in such a mixture should not be greater than about 6.6%. If the methanol is increased above this point, an explosive mixture results. Consequently the conventional practice in the synthesis of formaldehyde by the oxidation of methanol requires that a lower concentration of methanol be present.

Recent investigations, such as are described in the copending application of Monier and Brondyke, S. N. 483,184, now matured to U. S. Patent No. 2,436,287, February 17, 1948, circumvents this difficulty by maintaining a reaction mixture in which the oxygen is held below 10.9 volume percent oxygen in the oxidizing gas. As air contains about 21 volume percent oxygen an inert gas is added to air to lower its oxygen content. This may, for example, be nitrogen which is readily available as the gases issuing from the methanol oxidation reaction are high in nitrogen. The improvement of the copending application is a decided advance over the former processes inasmuch as an oxidizing gas containing 10.9% oxygen is non-explosive and all of the oxygen in such a gas can be consumed. While on the contrary, with a 14:1 air to methanol, there is a stoichiometrical insufficiency of methanol and most of the oxygen present in such a mixture is unused.

In accord with the present invention, it is possible to employ an oxidizing gas containing more than 10.9 volume percent oxygen and at the same time avoid explosive mixtures. In fact, the invention permits the use of a gas in the first stage of the reaction containing as high as about 13 volume percent oxygen and about 6.7 volume percent methanol. Subsequent injections of methanol between stages can bring the overall organic content (i. e. formaldehyde and methanol) of the converter gases to about 19% organics in contradistinction to about 6.6% for the conventional process and about 16% for the process using an inlet oxidizing gas containing 10.9 volume percent oxygen.

When conducting the operation with an oxidizing gas containing in the order of 13% oxygen, it has been found advantageous to carry out the oxidation in at least 5 stages. The amount of methanol to be introduced in each stage after the first can roughly be determined by dividing 19 (the percentage organics in the effluent gas) by one less than the number of stages. As the final stage is preferably used to clean up the last traces of methanol, no injection of methanol is introduced under these circumstances between this stage and the one before it. For most advantageous operation the amount of methanol introduced prior to the first stage may be increased by about 20% over that used in the succeeding stages. Accordingly with a converter having 11 stages, the first stage would be charged with 2.26% methanol and between all other stages except the last and next to the last stage 1.86% methanol is introduced.

This example illustrates the above described feature of the invention in which parts are by weight unless otherwise indicated.

*Example 3.*—A converter containing 11 trays was operated as follows: The gas entering tray 1 contained 13.0 mole percent oxygen and 1.7 mole percent methanol. The exit from this tray contained 11.8% $O_2$, 1.55% HCHO, 0.07% $CH_3OH$ and 0.08% CO. Before entering the second tray more $CH_3OH$ was injected to bring up the concentration to 1.7% $CH_3OH$ again. The stepwise conversion of the methanol was repeated 10 times. No methanol was injected before the 11th tray, the latter being used for clean-up. The exit gas from the 11th tray contained 1% oxygen, 16.3% HCHO, 0.1% $CH_3OH$ and 0.6% CO.

I claim:

1. In a process for the vapor phase oxidation of methanol to formaldehyde the improvement which comprises conducting the oxidation reaction in stages in each one of which methanol is catalytically oxidized to formaldehyde at a temperature between 225 and 500° C., cooling the gases between stages to remove the exothermic heat produced in the preceding stage and adding methanol to the gases between stages the oxygen content of the gas decreasing in each successive stage.

2. In a process for the vapor phase oxidation of methanol to formaldehyde the improvement which comprises conducting the oxidation reaction in a plurality of stages in each one of which methanol is catalytically oxidized with air to formaldehyde at a temperature between 225 and 500° C., cooling the gases between stages to remove the exothermic heat produced in the preceding stage, introducing all the oxygen before and adding a sufficient amount of methanol to the gases prior to the first stage and between stages to be stoichiometrically equivalent, in accord with the methanol oxidation to formaldehyde reaction, to the oxygen entering the first stage.

3. In a process for the vapor phase oxidation of methanol to formaldehyde the improvement which comprises conducting the oxidation reaction in stages in each one of which methanol is catalytically oxidized to formaldehyde at a temperature between 225 and 500° C., a temperature rise in each stage being held to less than 200° C., cooling the gases between stages and adding methanol to the gases between stages the oxygen content of the gas decreasing in each successive stage.

4. In a process for the vapor phase oxidation of methanol to formaldehyde the improvement which comprises conducting the oxidation reaction in several stages in each one of which methanol is catalytically oxidized to formaldehyde at a temperature between 225 and 500° C., introducing all of the oxygen prior to the first stage and the methanol prior to each stage, the gases being cooled between stages for the removal of the exothermic heat of reaction.

5. In a process for the vapor phase oxidation of methanol to formaldehyde the improvement which comprises conducting the oxidation reaction in several stages in each one of which methanol is catalytically oxidized to formaldehyde, introducing into each stage excepting the last stage only a fraction of the amount of methanol that can react stoichiometrically with the oxygen present to form formaldehyde, the summation of the methanol introduced in all stages being stoichiometrically equivalent, in accord with the methanol oxidation to formaldehyde reaction, to the oxygen introduced prior to the first stage.

6. In a process for the vapor phase oxidation of methanol to formaldehyde the improvement which comprises conducting the oxidation reaction in several stages in each one of which methanol is catalytically oxidized to formaldehyde, introducing into each stage excepting the last stage only a fraction of the amount of methanol that can react stoichiometrically with the oxygen present, the summation of the methanol introduced in all stages being stoichiometrically equivalent, in accord with the methanol oxidation to formaldehyde reaction, to the oxygen introduced prior to the first stage, the exothermic heat being removed between the stages.

7. In a process for the vapor phase oxidation of methanol to formaldehyde, the improvement which comprises conducting the reaction in a plurality of stages, in each one of which methanol is catalytically oxidized to formaldehyde, adding methanol and cooling the gases between stages, there being a sufficient number of stages to limit a temperature rise due to the exothermicity of the oxidation reaction, in each between 75 and 150° C. the oxygen content of the gas decreasing with each successive stage.

8. In a process for the vapor phase oxidation of methanol to formaldehyde which comprises conducting the oxidation reaction in stages in each one of which methanol is catalytically oxidized to formaldehyde, there being introduced into the first stage a methanol oxidizing gas reaction mixture, the oxidizing gas containing less than about 13% oxygen, from 0.6 to 6% oxygen being consumed in each stage the oxygen content of the gas decreasing with each successive stage.

9. In a process for the vapor phase oxidation of methanol to formaldehyde, the improvement which comprises conducting the oxidation reaction in stages in each one of which methanol is catalytically oxidized to formaldehyde, cooling the gases between stages and adding methanol to the gases between stages, the oxygen content of the gas decreasing with each successive stage.

10. In a process for the vapor phase catalytic conversion of methanol to formaldehyde, the improvement which comprises conducting the conversion in a plurality of stages, in each one of which methanol is catalytically converted in the presence of oxygen to formaldehyde, cooling the products of the reaction between the stages by the injection of cool methanol, the cooling between stages being sufficient to hold the temperature of the reactants in the succeeding stages to a temperature rise between 75 and 200° C., the oxygen content of the gas decreasing with each successive stage.

11. In a process for the vapor phase catalytic conversion of methanol to formaldehyde, the improvement which comprises conducting the conversion in a plurality of stages, in each one of which methanol is catalytically converted in the presence of oxygen to formaldehyde, adding methanol and cooling the products of the reaction between stages, there being a sufficient number of stages to limit the temperature rise due to the exothermicity of the reaction in each between 75 and 150° C., the oxygen content of the gas decreasing with each successive stage.

12. In a vapor phase process for the catalytic conversion of methanol by oxygen to formaldehyde, the improvement which comprises conducting the conversion in stages in each one of which methanol is converted by oxygen to formaldehyde, in one stage effecting the conversion by direct contact of the methanol with a methanol to formaldehyde conversion catalyst, in another stage effecting the conversion to formaldehyde of the unconverted methanol of the gaseous mixture from the prior stage and additional methanol by direct contact of the gaseous mixture with a methanol to formaldehyde conversion catalyst differing in chemical composition from that employed in the first stage, and cooling the gases between stages to remove a portion of the exothermic heat of reaction.

13. In a process for the vapor phase catalytic conversion of methanol by oxygen to formaldehyde, the improvement which comprises conducting the conversion in a plurality of stages at a temperature between 225° C. and 500° C., in each one of which methanol is catalytically converted to formaldehyde, the methanol to formaldehyde conversion catalyst which effects the conversion in one stage by direct contact with the methanol being chemically different from the methanol to formaldehyde catalyst of another stage.

EDMUND FIELD.

REFERENCES CITED

The following references are of record in the file of this patent:

UNITED STATES PATENTS

| Number | Name | Date |
|---|---|---|
| 677,670 | Krauss et al. | July 2, 1901 |
| 1,383,059 | Bailey et al. | June 28, 1921 |
| 1,972,937 | Jaeger | Sept. 11, 1934 |
| 2,173,111 | Hasche | Sept. 19, 1939 |
| 2,436,287 | Brondyke et al. | Feb. 17, 1948 |